US012269034B2

(12) United States Patent
Madadi et al.

(10) Patent No.: US 12,269,034 B2
(45) Date of Patent: Apr. 8, 2025

(54) VACUUM-ASSISTED DRYING OF FILTERS IN MICROFLUIDIC SYSTEMS

(71) Applicant: QuantuMDx Group Limited, Newcastle upon Tyne (GB)

(72) Inventors: Hojjat Madadi, Newcastle upon Tyne (GB); Robin Page, Newcastle upon Tyne (GB); Molly Rose Jowsey, Newcastle upon Tyne (GB); Thomas Michael Willshare, Newcastle upon Tyne (GB); Roberts Rimsa, Newcastle upon Tyne (GB)

(73) Assignee: QUANTUMDX GROUP LIMITED, Newcastle Upon Tyne (GB)

( * ) Notice: Subject to any disclaimer, the term of this patent is extended or adjusted under 35 U.S.C. 154(b) by 763 days.

(21) Appl. No.: 17/298,241

(22) PCT Filed: Nov. 28, 2019

(86) PCT No.: PCT/GB2019/053362
§ 371 (c)(1),
(2) Date: May 28, 2021

(87) PCT Pub. No.: WO2020/109798
PCT Pub. Date: Jun. 4, 2020

(65) Prior Publication Data

US 2022/0118451 A1 Apr. 21, 2022

(30) Foreign Application Priority Data

Nov. 29, 2018 (GB) ..................................... 1819417

(51) Int. Cl.
*B01L 3/00* (2006.01)
*A47L 15/42* (2006.01)
(Continued)

(52) U.S. Cl.
CPC ..... *B01L 3/502753* (2013.01); *B01L 3/50273* (2013.01); *B01L 2200/0621* (2013.01);
(Continued)

(58) Field of Classification Search
CPC ........... B01L 3/502753; B01L 3/50273; B01L 2200/0621; B01L 2300/0681;
(Continued)

(56) References Cited

U.S. PATENT DOCUMENTS

2003/0146139 A1 8/2003 Lutze et al.
2006/0205085 A1 9/2006 Handique
(Continued)

FOREIGN PATENT DOCUMENTS

CN 101903104 A 12/2010
CN 107 199 061 A 9/2017
(Continued)

OTHER PUBLICATIONS

Notification of Grant dated Jan. 31, 2024 for Chinese Patent Application No. 201980079121.0, 3 page.
(Continued)

*Primary Examiner* — Jennifer Wecker
*Assistant Examiner* — Oyeleye Alexander Alabi
(74) *Attorney, Agent, or Firm* — Knobbe, Martens, Olson & Bear, LLP

(57) ABSTRACT

Improved methods and devices using reduction of pressure for removing ethanol from filters in a fluidic or microfluidic system in point of care devices involve filters that are solid state extraction filters used to capture and/or concentrate nucleic acids prior to further downstream processing such as amplification by polymerase chain reaction. The method uses the induction of negative pressure with respect to atmospheric pressure to improve the efficiency of the ethanol removal process.

26 Claims, 2 Drawing Sheets

(51) Int. Cl.

| | |
|---|---|
| ***A61L 27/16*** | (2006.01) |
| ***A61L 27/56*** | (2006.01) |
| ***B01F 23/00*** | (2022.01) |
| ***B01F 23/41*** | (2022.01) |
| ***B01F 101/23*** | (2022.01) |
| ***B01L 7/00*** | (2006.01) |
| ***B01L 9/00*** | (2006.01) |
| ***B23Q 17/24*** | (2006.01) |
| ***C07K 14/705*** | (2006.01) |
| ***C08F 220/56*** | (2006.01) |
| ***C12M 1/34*** | (2006.01) |
| ***C12Q 1/04*** | (2006.01) |
| ***C12Q 1/18*** | (2006.01) |
| ***C12Q 1/6844*** | (2018.01) |
| ***C12Q 1/686*** | (2018.01) |
| ***G01N 1/31*** | (2006.01) |
| ***G01N 21/17*** | (2006.01) |
| ***G01N 21/3577*** | (2014.01) |
| ***G01N 21/359*** | (2014.01) |
| ***G01N 21/39*** | (2006.01) |
| ***G01N 21/45*** | (2006.01) |
| ***G01N 21/64*** | (2006.01) |
| ***G01N 21/77*** | (2006.01) |
| ***G01N 21/78*** | (2006.01) |
| ***G01N 27/414*** | (2006.01) |
| ***G01N 30/12*** | (2006.01) |
| ***G01N 30/68*** | (2006.01) |
| ***G01N 30/70*** | (2006.01) |
| ***G01N 30/72*** | (2006.01) |
| ***G01N 30/88*** | (2006.01) |
| ***G01N 33/00*** | (2006.01) |
| ***G01N 33/18*** | (2006.01) |
| ***G01N 33/50*** | (2006.01) |
| ***G01N 33/53*** | (2006.01) |
| ***G01N 33/543*** | (2006.01) |
| ***G01N 33/68*** | (2006.01) |
| ***G01N 33/74*** | (2006.01) |
| ***G01N 35/00*** | (2006.01) |
| ***G01N 35/04*** | (2006.01) |
| ***G01N 35/10*** | (2006.01) |
| ***G06T 7/00*** | (2017.01) |
| ***G06T 7/90*** | (2017.01) |
| ***G16H 20/60*** | (2018.01) |
| ***G16H 40/63*** | (2018.01) |
| ***H10K 10/46*** | (2023.01) |
| ***H10K 85/00*** | (2023.01) |
| ***H10K 85/20*** | (2023.01) |

(52) U.S. Cl.
CPC .................. *B01L 2300/0681* (2013.01); *B01L 2300/0816* (2013.01); *B01L 2400/0481* (2013.01); *B01L 2400/0633* (2013.01)

(58) Field of Classification Search
CPC ..... B01L 2300/0816; B01L 2400/0481; B01L 2400/0633; B01L 2300/0867; B01L 2300/0887
See application file for complete search history.

(56) References Cited

U.S. PATENT DOCUMENTS

| | | | | |
|---|---|---|---|---|
| 2008/0213872 | A1* | 9/2008 | Regan | G01N 35/08 422/255 |
| 2012/0115738 | A1 | 5/2012 | Zhou | |
| 2015/0151035 | A1* | 6/2015 | Huemer | B01L 3/5635 210/321.6 |
| 2016/0090588 | A1* | 3/2016 | Lofquist | C12N 15/1017 435/297.5 |
| 2016/0175836 | A1 | 6/2016 | Taylor | |

FOREIGN PATENT DOCUMENTS

| | | | |
|---|---|---|---|
| WO | WO 2009/049268 | A1 | 4/2009 |
| WO | WO 2016/121929 | A1 | 8/2016 |
| WO | WO 2021/067353 | A1 | 4/2021 |

OTHER PUBLICATIONS

Office Action dated Sep. 19, 2023 for Chinese Patent Application No. 201980079121.0, 13 pages.
Notice of Reasons for Refusal dated Sep. 26, 2023, for Japanese Patent Application No. 2021-530956, 10 pages.
International Search Report and Written Opinion mailed Jan. 30, 2020 received in International Application No. PCT/GB2019/053362.
Second Office Action dated Jan. 10, 2023 in Chinese Application No. 2019800791210.
Office Action dated Apr. 29, 2022 in Chinese Application No. 2019800791210.
Communication pursuant to Article 94(3) EPC issued on Aug. 5, 2024 in EP Application No. 19 816 418.8, 4 pages.
Certificate of Grant No. CN 113164957 B, granted on Mar. 26, 2024.
Grant Certificate Patent No. JP Patent No. JP 7499246 B2 granted on Jun. 13, 2024.

* cited by examiner

VACUUM-ASSISTED DRYING OF FILTERS IN MICROFLUIDIC SYSTEMS

PRIORITY AND CROSS REFERENCE TO RELATED APPLICATIONS

This application is the U.S. National Phase Application under 35 U.S.C. § 371 of International Application No. PCT/GB2019/053362, filed Nov. 28, 2019, designating the U.S. and published in English as WO 2020/109798 A1 on Jun. 4, 2020, which claims the benefit of Great Britain Application No. GB 1819417.5, filed Nov. 29, 2018. Any and all applications for which a foreign or a domestic priority is claimed is/are identified in the Application Data Sheet filed herewith and is/are hereby incorporated by reference in their entireties under 37 C.F.R. § 1.57.

TECHNICAL FIELD

The present invention relates to the drying of elements in a microfluidic device and more particularly to the removal by drying of an aqueous solution, preferably alcohol e.g. ethanol, from a microfluidic system which may contain a filter. More particularly it relates to improved methods and devices for removing aqueous PCR inhibitors such as ethanol from filters in point of care (POC) devices using reduction in pressure, where said filters are solid state extraction filters used to capture and/or concentrate nucleic acids acid prior to further downstream processing such as amplification by polymerase chain reaction (PCR).

BACKGROUND

Advances in microfluidics are such that point of care (POC) diagnostic devices which integrate molecular testing methodologies are becoming a reality. Many of these devices include means for allowing polymerase chain reaction (PCR) amplification techniques to occur on cassette or on chip. This is because, when looking at molecular data, once cells or samples have been lysed, or the nucleic acid is freed from the sample, many microfluidic sensing systems require the nucleic acid to be purified and/or concentrated before delivery to the sensor. Polymerase chain reaction (PCR) is a widely used technique used in molecular biology to exponentially amplify a copy, or copies, of a specific segment of DNA to generate a multitude of copies of said DNA sequence. Traditional PCR methods require the use of trained personnel to complete the assays and as such PCR is generally still performed in centralized laboratories by trained technicians with results supplied in a similar time frame to many culture techniques. Microfluidic devices integrating PCR can make this diagnostic tool available for POC testing and such systems have the advantages that they can be designed to be portable, with disposable cassettes, chips or slides on which the tests can be carried out. They can also be adapted to provide a faster result, with the goal being to provide actionable data in real-time or close thereto (i.e. in 1-2 hours or less rather than the days or weeks required for standard laboratory testing).

In order to fully integrate a PCR assay onto a microfluidic POC device, and particularly onto a device which allows fully on cassette sample-in answer-out analysis from a whole sample, or even from a pre-treated sample, the following steps will typically need to be incorporated into a flow through system;

sample loading,
cell lysis, nucleic acid extraction,
target nucleic acid amplification, and
amplicon detection.

Often some initial sample processing is also required.

Many of the challenges when developing a flow through system which incorporates PCR relate to separation of the nucleic acids from other cellular debris, as this must be done in a manner that will not prevent or interfere with the downstream PCR. For example, in molecular tests it is necessary to lyse cells in the sample to release nucleic acids, often using chaotropes followed by addition of alcohol, and then to separate or isolate the nucleic acids from unwanted cellular debris and contaminants such that the nucleic acids can then be amplified.

A typical benchtop isolation protocol of nucleic acid involves precipitations using ethanol, phenol or 2-propanol. For example, for a whole blood sample, a typical nucleic acid extraction process may include the addition of citrate buffer to a sample, which is then mixed and centrifuged to give a pellet and supernatant. After the supernatant is discarded, the pellet is resuspended in a solution of detergent and proteinase K, and the mixture is incubated for 1 hour. The sample is then extracted once with a phenol/chloroform alcohol solution (most protein moves to the organic phase or the organic aqueous interface, and solubilised DNA remains in the aqueous phase) and after centrifugation the aqueous layer with the solubilised DNA is removed to a fresh tube. The DNA is precipitated in ethanol, resuspended in buffer, and precipitated in ethanol a second time. The pellet is then dried to remove the alcohol/ethanol. Buffer is then added and the DNA is resuspended by incubation overnight.

Several kits are available to simplify this process. For example, companies have developed solid phase extraction kits such as silica column kits for nucleic acid purification which provide a relatively quick (around 30 min) way to purify nucleic acids. However, these kits still need a researcher to pipette in buffers etc. and require centrifugation to produce pellets and supernatant. The centrifugation aspect in particular does not lend itself to use in a flow through POC system.

Solid phase extraction (SPE) and micro-solid phase extraction (mSPE) is a method which can be used to prepare DNA samples for genetic analysis and is more appropriate than many other methods for use within microfluidic cassettes. Nucleic acid is able to bind with filters, such as silica or glass fiber filters, in high ionic strength solutions due to decreases in the electrostatic repulsion. After washing with a non-polar solvent, DNA is then eluted with a low ionic strength buffer.

Whilst the SPE and mSPE methods described provide an isolated nucleic acid for further processing, there are still challenges if there is alcohol such as ethanol present. This alcohol can also result if further problems downstream by effecting the efficacy of the downstream PCR reaction itself. Complete removal of alcohol from the process is difficult as it can in some certain circumstances be used for lysis but more generally is the principle agent used to promote binding of the nucleic acid to a solid phase, be that a filter or a bead/matrix. As such, when filters are integrated into microfluidic cassettes there typically must also be a mechanism in place for removing as much alcohol, typically ethanol, from the filter, before the filter is used to isolate the nucleic acid, otherwise when elution buffer (which is typically deionised water) is run through the filter it not only elutes the nucleic acid but also picks up residual ethanol. In the majority of cases, the cassette is simply heated for a period of time after the initial wash steps to dry it out more fully before the nucleic acid capture step occurs, however this increases the overall time of the test.

It would be desirable to provide a microfluidics cassette and method of using the same which obviates or mitigates some of the problems associated with the prior art.

Throughout this document reference to "microfluidic" means with at least one dimension less than 1 millimetre and/or able to deal with microlitre or less portions of fluid.

Throughout this document reference to "cassette" or "chip" means an assembled unit comprising one or more substrates with channels or chambers therein through which fluid can flow. Such cassettes may include different regions or zones in which activities such as sample mixing, filtering, PCR amplification, identification and/or visualisation can occur and may include on-board reagents. The cassettes are typically designed to be received by a diagnostic instrument such as a point-of-care (POC) instrument which incorporates additional functionality to allow a diagnostic test, or part of such a test, to be automated.

Reference to 'guage pressure' refers to the amount by which the pressure measured in a fluid exceeds that of the surrounding atmospheric pressure.

SUMMARY OF THE INVENTION

The present invention relates to a device with a fluidic channel comprising; a material to be dried, which is preferably a filter, positioned within a portion of the channel; one or more valves configured to releasably seal a portion of the channel which contains the filter therein, and means for reducing the pressure in said portion of the channel wherein said means acts to substantially simultaneously draw fluid through or over the material to be dried, which is preferably a filter, and to reduce the pressure in said portion of the channel containing the material to be dried, which is preferably a filter.

Most preferably the means for reducing the pressure reduces pressure below atmospheric pressure (i.e. results in negative guage pressure).

Advantageously, reducing the pressure in the portion of the channel containing the material to be dried (e.g. a filter) to give negative gauge pressure, or pressure less than atmospheric pressure, creates a gas or vapour flow through the filter that improves the speed at which it dries and therefore also increases the speed of removal of unwanted ethanol from said filter material which occurs by evaporation. When referencing drying, this refers to the removal of water or a solvent such as ethanol by evaporation. However, in addition to this, as the overall pressure in the sealed portion of the channel is decreased with respect to atmospheric, the boiling temperature of any liquid such as ethanol present on the filter decreases (or more precisely, the vapour pressure is decreasing, which is directly correlated to the boiling temperature). As a consequence of the decreased boiling point, evaporation rate of liquid such as ethanol is significantly higher than in a system where there is no pressure change or just positive pressure is applied, and the filter is dried quicker (or the ethanol is more rapidly evaporated and partially or entirely removed from the filter).

The fluidic channel is formed in a substrate.

Preferably the means for reducing pressure is positioned upstream of the material to be dried.

Advantageously this ensures that when the drying of the material, which is preferentially a filter, occurs, any fluid e.g. liquid and/or vapour that is drawn out or through the filter is drawn away from the amplification zone which is downstream of the filter—this is particularly important if removing ethanol from a filter as the ethanol can inhibit the downstream amplification.

Optionally, the means for reducing pressure is a pump adapted to draw fluid from a first end of said portion of the channel. Preferably the pump draws fluid e.g. liquid and/or vapour from the first end of said portion of the channel more rapidly than fluid can enter said portion of the channel.

Preferably said portion of the channel is a sealable portion of the channel.

Preferably, the means for reducing pressure is a volume of said portion, or a volume that is in fluid communication with said portion, that is changeable to change a pressure within the sealable portion when it is sealed.

Advantageously, by increasing said volume, this creates additional space into which fluid can move. As the portion is sealed this results in the pressure in that portion being reduced.

Alternatively, the means for reducing pressure acts to remove a portion of fluid from the sealable portion.

For example, it is possible to expel the air from the portion such that it does not refill, e.g. through the use of valve system or one-way valve Preferably the fluidic channel is in or on a microfluidic cassette. Optionally the microfluidic cassette is formed of polypropylene.

Preferably the fluidic channel is, at least in part, a microfluidic channel.

Preferably the material to be dried is a filter material.

Preferably the filter comprises a solid phase extraction material.

The filter material exhibits sufficient hydrophilicity and sufficient electropositivity to bind DNA from a suspension containing DNA and then permit later elution of the DNA from the material.

Preferably the filter is a glass filter, a glass-fibre filter, a cellulose filter or a polypropylene filter.

Preferably there is a sealing means downstream of the filter. Optionally the sealing means is provided at an inlet to the channel, or it may be provided as a valve within the channel.

Preferably, the sealing means defines a first end of the sealable portion of the channel.

Advantageously the sealing means can move between a sealed (closed) and unsealed (open) position.

The seal is fluid-tight. In particular it is air-tight.

In this case fluid refers to both liquid, vapour and gas.

Preferably the means for reducing pressure in the channel defines a second end of the sealable portion of the channel.

It would be understood that the sealing means (seal) could also be provided upstream of the filter and the means for reducing pressure in the channel could be provided downstream of the filter. The filter being positioned between the sealing means and the means for reducing pressure (pressure reducer-more preferably a displacement pump such as a bellows pump).

For example, the sealing means (seal) in this variant may be a valve but could also be a plug which seals the sample inlet.

Optionally the sealing means is a valve. This may be a one-way valve; however, it is much preferred that the sealing means allows fluid flow in both directions.

Optionally the sealing means is a plug. The plug may close off the channel from the external surface of the cassette.

Preferably, the volume of the channel between the sealing means and the filter is greater than 10 μl; more preferably the volume of the channel between the sealing means and the filter is greater than 20 μl; yet more preferably the volume of the channel between the sealing means and the filter is greater than 30 μl; in a preferred embodiment the volume of the channel between the sealing means and the filter is 60 μl; most preferably, the volume of the channel between the sealing means and the filter is greater than 60 μl.

Advantageously, by having a sufficiently large volume in the channel between the sealing means and the filter, this ensures that when the sealing means (e.g. valve) is closed there is an appropriate fluid volume to draw back through the filter to give a drying effect (e.g. the effect of removing unbound ethanol from the filter).

Preferably the volume of the channel outwith the sealable portion of the channel, but in fluid communication with the sealable portion of the channel when the sealing means is open, is larger than the volume of the sealable portion of the channel.

Preferably the means for reducing pressure (pressure reducer) is a positive displacement pump.

Preferably the means for reducing pressure comprises, or is associated with, a pressure actuator.

Optionally the pressure actuator is a negative pressure actuator for reducing pressure.

Preferably the means for reducing pressure in the channel when said sealable portion is sealed is a deformable bellow.

The deformable bellow may be referred to as a bellows pump.

A bellows pump is a type of positive displacement pump that uses a bellows device to move fluid through channel. The bellows pump is basically a compressible container, typically substantially hemispherical, with an internal cavity that changes in volume when the bellows are compressed or decompressed. The internal cavity is fluidically linked with a channel.

Preferably the deformable bellow is resiliently biased to expand/decompress.

Advantageously, the fluidic channel is arranged such that the expansion of the bellow acts to draw fluid from the sealable portion into the bellow such that when the sealable portion is sealed this results in a negative gauge pressure, or a reduced pressure, below atmospheric pressure being induced in the sealable portion.

Preferably the deformable bellow is provided at an end of the microchannel.

The microchannel may be branched.

Optionally, there is an actuatable valve, or closure means, positioned between the means for reducing pressure, which is preferably a displacement pump such as a bellows pump, and the filter.

Advantageously, this allows unwanted unbound material such as ethanol which has been drawn back (or pushed back) towards the means for reducing pressure/displacement pump to then be closed off in a portion of the channel such that it will not be present for future activities such as the elution of bound material, e.g. DNA, from the filter.

Alternatively, the volume of said sealable portion that is changeable to change a pressure within the sealable portion is a syringe pump.

Preferably the fluidic channel is adapted to be selectively heatable. Optionally, the fluidic channel comprises, or is proximate to, a heat source. Most preferably, the heat source is close to or in contact with the filter.

According to another aspect of the present invention there is provided a microfluidic cassette comprising a fluidic channel of the first aspect.

According to another aspect of the present invention there is provided a method of purifying nucleic acids comprising:

- providing the device with a fluidic channel of the first aspect;
- flowing fluid comprising at least some PCR inhibitor through a filter;
- flowing sample through the filter, such that any nucleic acid potentially present in the sample is bound to or retarded by the filter;
- reducing the pressure in the portion of the channel comprising the filter to substantially simultaneously draw fluid through or over the filter, and to reduce the pressure in said portion of the channel containing the filter;
- flowing elution buffer through the filter to elute any nucleic acid bound to, or associated with, the filter.

Preferably, after the step of reducing the pressure in the portion of the channel comprising the filter, the reduced pressure is maintained for at least 3 minutes. It would however be understood that the reduced pressure could be maintained for lesser time if required.

Optionally the PCR inhibitor is ethanol.

Optionally, prior to inducing a negative pressure there is a step of sealing said portion of the channel.

Preferably, where said portion of the channel has been sealed the method further comprises the step of unsealing the sealable portion of the channel prior to the step of flowing elution buffer through the filter.

This step results in a rapid equilibration of pressure and a burst of rapid airflow through the filter.

Preferably reducing the pressure in the portion of the channel comprising the filter results in the pressure in said portion being below atmospheric pressure.

Preferably the alcohol is ethanol.

Preferably the elution buffer is de-ionised water.

Optionally the step of sealing the sealable portion of the channel occurs prior to the step of inducing a negative pressure in the channel for a period of time to dry the filter.

Alternatively, the step of sealing the sealable portion of the channel occurs substantially simultaneously with the step of inducing a negative pressure in the channel for a period of time to dry the filter.

Optionally, during and/or after, the step of inducing a negative pressure in the channel for a period of time to dry the filter, the temperature of the filter is raised.

The temperature to which the filter is raised is limited by the boiling point of the elution buffer or temperature at which we are starting to damage the material retained at the filter (i.e. DNA in this case). However, higher temperature result in quicker evaporation rate of alcohol and can improve elution. Preferably, the temperature is raised to between approximately 70° C. to 90° C.

Preferably, during the step of inducing a negative pressure in the channel, the temperature of the filter is raised.

Optionally, multiple wash steps of flowing buffer through the filter can be included.

Preferably when flowing fluid comprising at least some PCR inhibitor through the filter, after passing through said filter said fluid is directed to a waste chamber.

Preferably, the PCR inhibitor is drawn away from the PCR section of the cassette. Preferably when flowing sample through the filter, after passing through the filter said fluid is directed to a waste chamber.

Preferably when flowing elution buffer through the filter said fluid is directed to a downstream amplification zone for further processing and/or analysis.

Various further features and aspects of the invention are defined in the claims.

BRIEF DESCRIPTION OF THE DRAWINGS

Embodiments of the present invention will now be described by way of example only with reference to the accompanying drawings in which like parts are provided with corresponding reference numerals and in which.

DETAILED DESCRIPTION

Figure 1:
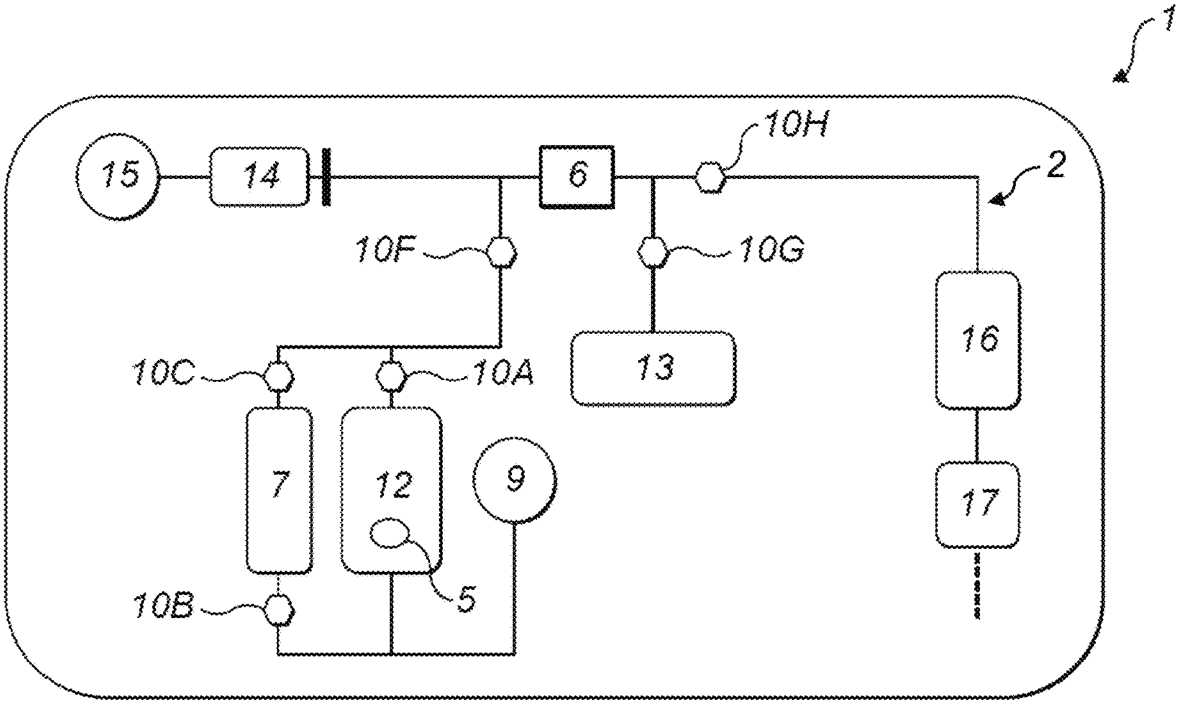
FIG. 1 provides an internal plan schematic of a microfluidics cassette in accordance with an aspect of the present invention, showing a typical flow path.
Figure 2:
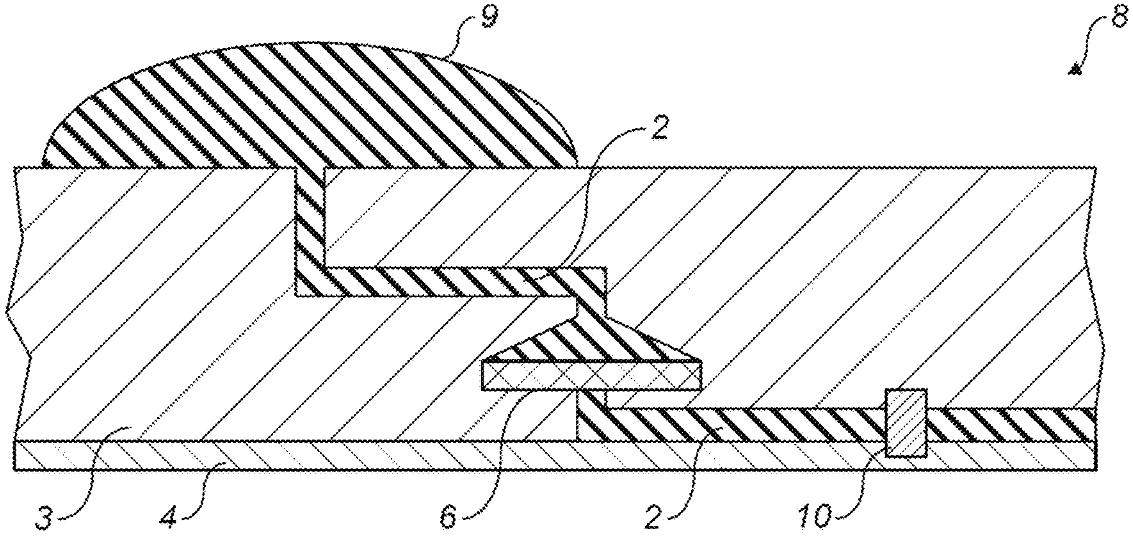
FIG. 2 shows a section view of a simplified sealable portion in accordance with an embodiment of the present invention.

According to a first aspect of the present invention, and as shown in FIG. 1 as a schematic, there is provided a microfluidic cassette 1 with a micro-channel 2, where the microchannel allows for continuous flow-through of fluid as required. The micro-channel 2 is formed inside the microfluidic cassette 1, in the desired length and shape to allow the passage of a sample, preferably a biological sample in liquid format, and/or reagents, some of which may be incorporated on-cassette during the flow-through, along a fluid flow path and through various zones or areas which allow different activities to occur. Various valves and offshoots can be used to allow mixing, washing, removal and other actions to occur as needed. The channel 2 is formed in a first surface of a first substrate 3, as shown in FIG. 2, which is typically a substantially planar, substantially rigid substrate which in this embodiment is polypropylene. The first substrate 3 is overlaid with a second substrate 4, which in this embodiment is a polypropylene film. By bonding the first substrate material 3 to the second substrate 4, which in this embodiment is a polypropylene film, for example using laser welding, a substantially closed channel 2 is provided (inlets and outlets to the external surface(s) of the cassette can be included as required). It will be understood that if the first substrate 3 is a planar element with an upper and lower surface, the majority of the microchannel 2 can formed in the upper surface or the lower surface. It is however often desirable that the second substrate 4, which in this embodiment is a polypropylene film, forms the upper wall of the microchannel 2 in use.

Alternatively, it would be understood that although this embodiment has the second substrate as a film 4, the second substrate can be another material and may itself have grooves or channel formed on its surface that can be aligned with the channels of the first substrate. By bonding the substrates 3, 4 together, a substantially closed channel 2 is provided (again inlets and outlets can be included as required).

It should be noted that FIG. 1 is a pictorial representation which has not been drawn to scale. In particular, in preferred embodiments the valves will typically be positioned close to junctions rather than partway down the channel to avoid fluid movement down part of a blocked channel in use. However, to aid visualisation in FIG. 1 the valves have been depicted more centrally within the channels than would generally be preferred in practice where the valves it would generally be positioned to minimise 'dead-ends' in the fluid flow-path.

Where necessary, the first and second substrates 3, 4 can be aligned prior to bonding. The length and cross-sectional shape of the channel 2 can be any appropriate shape to allow for the desired transport and processing of a sample and or reagents. There may be on-cassette reservoirs 7, which fluidly connect to the channel 2 as well as waste chambers 13 or outlets. Discrete portions of the channel 2 can be opened or closed using valves of any appropriate type-such microfluidic systems 'lab-on-a-chip' type systems being well known in the art.

The cassette 1 is provided with an inlet 5 for receiving a sample into a first chamber in the microfluidic channel. In this embodiment, the sample has been pre-processed to lyse the cells present in the sample, however it would be understood that the cassette could include a lysis section or chamber such that the lysis step could occur on cassette if required.

Downstream of the inlet 5, and lysis chamber if present, is a glass-fibre filter 6 of approximately 0.26 mm thickness to which DNA can bind. Other filters for binding DNA in this manner are known to those skilled in the art.

An on-cassette reservoir 7, for example, a wet reagent reservoir, is provided upstream of the filter 6, which in this embodiment contains ethanol or is an aqueous solution containing a high percentage of ethanol.

It would be understood that additional wet reagent reservoirs and/or wash buffer reservoirs could be incorporated onto the cassette. A combination of fluid channels and valves similar to those used for an on-cassette reservoir 7, for example, a wet reagent reservoir, would be used for the additional reservoirs.

Downstream of the filter 6 there is a waste chamber 13.

Also downstream of the filter 6 is an area or a portion of, or chamber in, the micro-channel 2 which is dedicated to performing PCR, i.e. 'the amplification zone' 16 such that nucleic acids of interest are amplified. The amplification zone 16 may have annealing, extension and denaturation areas. Then, downstream from the amplification zone 16 of the cassette 1, there is a portion of the channel 2 that forms a microarray or capture chamber 17 that provides for capture of the amplified material of interest. The capture chamber 17 also allows for the viewing or imaging of the captured material through a viewing surface. For example, a camera can be aligned with the capture chamber.

It will be understood that the microfluidic channel 2 can be provided with a number of valves 10 and that said valves 10 can be actuated to ensure fluid flow to the desired areas of the channel 2 as required—for example, downstream of the filter 6, valves can be used to direct flow either to the waste chamber 13 or on to the amplification zone 16 as desired. Directing the flow of material in this manner is known to those skilled in using and making lab-on-a-chip and diagnostic cassette devices.

As shown in FIG. 2, the filter 6 is provided in a selectively sealable portion 8 of the microfluidic channel 2. The selectively sealable portion 8 of the channel 2 is sealed by one or more fluid tight valves 10 being closed such that the sealable portion 8 of the channel becomes a fluid tight area i.e. fluid cannot flow into or out of the area when it is sealed. It would be well understood that valve actuation can occur in several ways, most commonly with set interactions with the instrument into which the cassette 1 is placed during use. Where the channel 2 is branched it may be necessary to close multiple fluid tight valves to seal the sealable portion 8. The selectively sealable portion 8 of the channel 2 is fluidly connected to a means for altering the pressure in a channel, which in this embodiment is a bellows pump 9 that has a cavity therein. The bellows pump 9 is upstream of the filter 6 whilst at least one of the fluid tight valves which are closed to selectively seal the sealable portion is downstream of the filter 6. The cavity of the bellows pump 9 is in fluid communication with the sealable portion 8 of the channel 2 even when said portion 8 is sealed. The bellows pump 9 is compressible and is resiliently biased to return to its uncompressed/decompressed state. As such, the bellows pump 9 can create alternating positive and negative pressure within the channel 2 when the sealable portion 8 is sealed. When the bellows pump 9 compresses, or is compressed, it pushes fluid in the channel 2, to which it is fluidly connected, in a first direction away from said bellows pump 9. When the bellows pump 9 decompresses, the fluid in the channel 2 is drawn in the opposite direction i.e. towards and into the cavity of the bellows pump 9. The bellows pump can be compressed and decompressed by different amounts, i.e. it can be partially compressed to varying levels, to allow for different levels of movement within the channel.

In this embodiment, the sealable portion 8 is adapted to be sealed at a point when the bellows pump is at least partially, and ideally totally, compressed such that, when sealed, the sealed portion and fluidly connected bellows pump 9 have a first fixed internal volume of approximately 25 µl. The return of the bellows pump to a decompressed state, creates a partial vacuum in the cavity of the bellows pump 9 into which fluid from the now sealed sealable portion 8 will flow. The return of the bellows pump to a decompressed state also results in the internal volume of the sealed portion and fluidly connected bellows pump 9 increasing. As the sealable portion 8 is fluid tight when sealed, this results in fluid (typically air), present within the sealable portion 8 and downstream of the filter 6 (or at least on the other side of the filter to the bellows pump 9), being drawn through the filter 6—and the sealed sealable portion 8 having a negative pressure with respect to the pressure in the rest of the channel system or atmosphere. The filter 6 is positioned within the sealable portion 8 between the bellows pump 9 and the sealing means, which in this case is a valve 10 (or valves, in FIG. 1 the sealing means is 10H, combined with 10G). In order to have appropriate airflow at this stage through the filter 6, there must be an appropriate volume in the channel between the filter and the sealing means. If there is insufficient volume between the filter 6 and the sealing means 10H/10G, the airflow across the filter 6 will be limited and the drying effects/ethanol removal effects limited. In a preferred embodiment, the volume of the channel between the filter 6 and the sealing means is 60 µl. It is generally preferred that the volume of the channel between the sealing means and the filter is greater than 10 µl; more preferably the volume of the channel between the sealing means and the filter is greater than 20 µl; yet more preferably the volume of the channel between the sealing means and the filter is greater than 30 µl; most preferably the volume of the channel between the sealing means and the filter is 60 µl or greater. Further, it is preferred that the volume of the channel between the sealing means and the filter is less than the volume of fluid that can be removed by the means for reducing the pressure that is being used (which may for example be the internal cavity of a compressible bellow, the internal cavity that can be varied of a syringe pump etc.).

The sealable portion 8 of the channel 2, excluding the cavity of the bellows pump 9, has a volume of approximately 25 µl. The cavity of the bellows pump 9, when in its uncompressed state has a volume of approximately 2500 µl.

Whilst this embodiment utilises the compression and decompression (or deformation and reformation) of a resiliently biased bellows pump 9 to move air and to alter the pressure within the channel 2, and more relevantly within the sealed portion 8 when it is sealed, it would be understood that other means for moving air into, through and from the channel 2 could be used.

In this embodiment the portion of the channel 2 in which the filter 6 is disposed is heatable by an external heater. It would however be possible to include heating elements in the channel to selectively heat the filter 6.

In a particular embodiment of the invention, the portion of the channel 2 in which the filter 6 is disposed is frustoconically shaped to ensure that both appropriate fluid flow and heating of the filter occurs. The upstream portion of the channel where the filter is 6 is disposed is a funnel-shaped channel which broadens as it gets closer to the front surface of the filter. This exposes a relatively large portion of the filter surface to the air flow when negative pressure is applied or released. The portion of the channel that is immediately downstream from the filter is substantially flat or planar, with a central channel extending substantially perpendicularly away from the filter (it acts like a shoulder on which the filter can sit). This effectively increases the surface contact of channel wall and the filter for more efficient heat transfer and to reduce dry process time (this works well with a heater that is designed to externally contact the cassette and heat up the filter via the backbone of the cassette; for example a heater may be present on an external instrument and be brought into contact with a cassette-ideally into contact with the external wall of the shoulder-which has the filter disposed therein).

In this embodiment the valves and bellows pumps can be actuated be external actuators. Said external actuators can be provided as part of a larger diagnostic device, such as a point of care (POC) diagnostic device that is known in the art, which is able to receive the microfluidic cassettes and use automated systems to carry out the various events required to complete the test. Such cassettes and instruments are known in the art.

Method of Use

The nucleic acid extraction method initially involves multiple wash steps of flowing liquids through the filter 6, each of these liquids containing various concentrations of PCR inhibitors, in this case ethanol. For efficient DNA capture at the end of washing, the filter must be PCR inhibitor-free e.g. ethanol-free or a close as possible thereto. Otherwise, capture is inhibited and when the elution buffer (typically de-ionised water) is flown over the filter, residual ethanol is also picked up consequently inhibiting the PCR. However, traditional steps to remove ethanol, such as heating the cassette, add significant time to the nucleic acid extraction or purification process.

A method of using the cassette described above is provided and described with reference to FIGS. 1 and 2. In use, 400 µl of sample is loaded into the inlet chamber 12 of the cassette 1 via the inlet 5. Initially all valves 10 are closed. Valve 10A is then opened and a bellows pump 9, is compressed to push the sample into the micro-fluidic channel 2 such that it mixes with proteinase K(ProK) reagent present in a portion of the channel 2. The bellows pump 9 is then decompressed such that it pulls the sample (mixed with ProK) back into sample inlet chamber 12. Valve 10A is then closed and valves 10B and 10C are opened. The bellows pump 9 is used (compressed) again to push ethanol from ethanol reservoir 7 out into the microfluidic channel 2 and then valves 10B and 10C are closed and valve 10A opened and the bellows pump 9 is decompressed such that ethanol is pulled back into the sample inlet chamber 12 to mix with sample (mixed with ProK). Valve 10F and valve 10G are then opened and bellows pump 9 is used (i.e. compressed again) to push all the sample/ethanol mix through filter 6 and into the waste chamber 13. At this point the sealable portion 8 is sealed (in this case by closing valve 10G (with valve 10H remaining sealed) such that substantially all the liquid sample 'slug' is retained in the waste chamber 13. The bellows pump 9 (now in a compressed position having been used to push all sample and ethanol through filter 6 and into the waste chamber 13) is then allowed to decompress. As substantially all of the liquid has been moved to the waste chamber 13, the channel 2 contains mainly air (with nucleic acid having been bound by the filter along with possibly some residual ethanol), and as such the decompression of the bellows pump 9 increases the volume of the sealed portion and creates a partial vacuum in the channel 2, which includes the filter 6, resulting in the pressure in the sealable portion being reduced to below atmospheric pressure (induction of a 'negative pressure'). In this embodiment the sealed sealable portion 8 has a starting pressure of approximately 1 bar and has a final pressure after the bellows pump 9 has decompressed of approximately 10 mbar. The air present in the sealed sealable portion 8, some of which is drawn through the filter and as such includes residual ethanol from the filter, gets drawn back into the bellows pump 9. Effectively, this acts to rapidly dry, or remove any residual ethanol, from the filter 6. Concurrently, the filter 6 is heated by the application of a heat source proximate to the location of the filter 6. In some embodiments, valve 10H is then opened. The partial vacuum, or at least the area of lower pressure, which was generated in the sealed portion of the channel is then re-equilibrated. More specifically, when valve 10H is opened the partial vacuum release causes a highspeed flow of air through the filter due to the air rushing into the low-pressure area from the area beyond valve 10H which had been at atmospheric (or at least a higher pressure). This high-speed air flow assists in driving off any final unbound material such as ethanol (evaporated or still liquid phase) from the filter and pushes it away along a path which will not be used for the elute in the next step of extraction process.

In this embodiment, the volume of the channel beyond valve 10H (i.e. the portion of channel that is outwith the sealable portion but is in fluid communication with the sealable portion when valve 10H is open) is of larger volume than the volume of the sealable portion 8. In this case, the volume of the sealable portion 8 is 1.9 mL and the volume of the channel beyond valve 10H (i.e. the portion of channel that is outwith the sealable portion but is in fluid communication with the sealable portion when valve 10H is open) is 5.2 mL. It would be understood that this volume can be changed depending on requirements of the system i.e. the volume beyond valve 10H (i.e. the portion of channel that is outwith the sealable portion but is in fluid communication with the sealable portion when valve 10H is open) could be two times the volume, and it would also be understood that a yet greater volume could be used. Having this greater volume of air suddenly enter the sealable portion when valve 10H is released results in rapid and vigorous airflow through the filter—the volume beyond valve 10H (i.e. the portion of channel that is outwith the sealable portion but is in fluid communication with the sealable portion when valve 10H is open) will define the resulting pressure differential and thus the speed of the airflow when valve 10H is re-opened and pressure equilibration between the volume beyond valve 10H (i.e. the portion of channel that is outwith the sealable portion but is in fluid communication with the sealable portion when valve 10H is open) and the volume of the sealable portion 8. It would be understood that requirements for waste volume and the bonding strength of the cassette will place limitations on the suitable pressure differentials and volumes.

Valve 10F is then closed preventing the ethanol, that has been drawn back towards the bellows pump 9 when it was decompressed, and also potentially further driven off the filter when the pressure was re-equilibrated, from moving back through the filter 6 or beyond. An elution buffer can then be pushed through the filter 6 to elute the DNA which has been bound thereto. In this embodiment the de-ionised water elution buffer is held in a sealed elution reservoir 14. Once Valve 10F is closed, the elution reservoir 14 is unsealed and a second bellow 15 is used to push de-ionised water over filter 6 to elute any bound DNA therefrom. At this point valve 10G is closed and valve 10H opened such that the eluted DNA is directed to the amplification zone 16 rather than the waste chamber 13.

The above is a more efficient way of drying the filter, whereby drying in this context specifically refers to removing unbound fluid or vapour from the filter-most particularly unbound fluid or vapour alcohol such as fluid or vapour ethanol, by both heating the filter and reducing the of pressure in the portion of the channel system, i.e. the sealed sealable portion 8, containing the filter 2. The sealable portion 8 can be sealed prior to the reduction of pressure. Effectively the increasing of the volume within the air-tight sealed portion is such that a partial vacuum is created and ultimately the pressure within that portion drops compared to what it was and compared to surrounding or atmospheric pressure. This induction of a negative gauge pressure within the sealed portion where the filter is disposed has two effects-firstly, as the partial vacuum is created in the cavity of the bellows pump, it draws fluid into it and effectively creates an air or fluid flow through or across the filter that helps drying (said drying being the removal by evaporation of unbound liquid ethanol or similar from the filter). The second effect is that as the overall pressure of the system is decreased, ideally to below that of atmospheric pressure, the ethanol boiling temperature decreases (more specifically the ethanol vapour pressure is decreasing, which is directly correlated to the boiling temperature). As a consequence of the now decreased boiling point, the evaporation rate of ethanol is significantly higher than in a system where the pressure remains the same or even where just positive pressure is applied, and the filter is dried more rapidly (i.e. ethanol or similar is removed from the filter more rapidly) than in such systems. This substantially simultaneous drawing of gas or vapour through or across the filter and reduction of pressure at/of the filter allows for significantly more rapid drying and/or ethanol removal. The application of heat to the filter improves this yet further. In comparative experiments carried out by the inventors, in the system without the reduced or negative pressure being applied it was taking 10 ml of air at 1 ml/minute and 10 minutes of drying time to appropriately remove ethanol from the filter. However, using the fluid channels and implementation of reduced pressure as described above, particularly so that the pressure in the portion of the channel proximate the filter is below atmospheric pressure, the time required was reduced to between 3 and 5 minutes depending on the extent of removal required.

Figure 3:
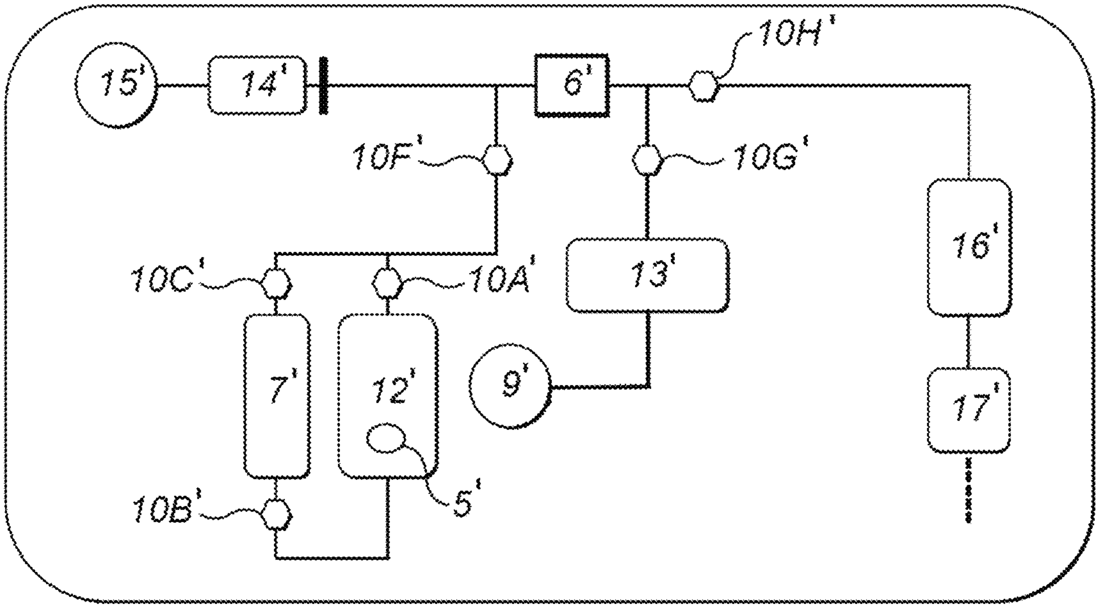
FIG. 3 provides an internal plan schematic of a microfluidics cassette in accordance with another alternative aspect of the present invention, showing an alternative flow path.

Whilst the above embodiments are primarily described with respect to FIGS. 1 and 2, where the means for reducing pressure (in these examples a bellows pump) is upstream of the filter and a sealing means (in this example a valve) is provided downstream of the filter, it would be understood that the sealing means could in fact be upstream of the filter and the means for reducing pressure positioned downstream. An example of this is shown in FIG. 3. The components in FIG. 3, i.e., capture chamber (17'), amplification zone (16'), second bellow (15'), elution reservoir (14'), waste chamber (13'), inlet chamber (12'), valves (10A', 10B', 10C', 10H', 10F', and 10G'), bellows pump (9'), wet reagent or ethanol reservoir (7'), and inlet (5'), are substantially the same as in FIG. 1—however the bellows pump 9' is now downstream of the filter 6' (the bellows 9' now effectively pulling sample from the inlet 5' towards the waste 13') and the sealing means is in fact a plug (not shown) that seals the inlet 5' in an air and fluid tight manner. The method of actuating the valves would need to be adapted accordingly to appropriately 'pull' slugs of sample—as would be understood by one skilled in the art.

Whilst the above describes a preferred embodiment wherein the filter is disposed in a sealable portion of a microfluidic channel, it is envisaged that pressure could be reduced in the portion of the channel that includes the filter even without fully sealing said portion. For example, a suction pump could be used in place of the bellows pump described above. Providing said suction pump removes fluid more rapidly from the portion of the channel containing the filter than it can be replaced (for example if the suction pump is provided upstream of the filter and downstream of the filter is either closed with an airtight seal or allows only limited fluid inflow at a rate lower than that which the suction pump is removing fluid) the use of the suction pump to draw air from the channel could be used to again substantially simultaneously draw fluid through the filter and reduce the pressure in the portion of the channel that contains the filter.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

What is claimed is:

1. A microfluidic device with a fluidic channel, comprising:

a filter positioned within a sealable portion of the fluidic channel, a valve configured to releasably seal the sealable portion of the fluidic channel which contains the filter therein, and a displacement pump in the sealable portion of the fluidic channel, the displacement pump being configured to displace a volume greater than a volume of the sealable portion and configured to reduce a pressure in said sealable portion of the fluidic channel which contains the filter therein, wherein the displacement pump is configured to substantially simultaneously draw fluid through or over the filter, and is configured to reduce the pressure in said sealable portion of the fluidic channel containing the filter;

wherein the filter divides the sealable portion into a first volume between said valve and the filter and a second volume between the displacement pump and the valve, wherein the first volume is smaller than the second volume, and wherein a volume of the fluidic channel downstream of the valve is larger than the volume of the sealable portion.

2. The microfluidic device as in claim 1, wherein the displacement pump is configured to reduce the pressure to below atmospheric pressure.

3. The microfluidic device as in claim 1, wherein the displacement pump is adapted to draw or extract fluid from a first end of said portion of the fluidic channel.

4. The microfluidic device as in claim 1, wherein said portion of the fluidic channel which contains the filter therein is a sealable portion of the fluidic channel.

5. The microfluidic device as in claim 4, wherein a volume of the displacement pump is about the same as or greater than a volume of said sealable portion, or a volume that is in fluid communication with said sealable portion, and wherein the displacement pump is changeable to change a pressure within the sealable portion when it is sealed.

6. The microfluidic device as in claim 4 wherein the displacement pump is configured to remove a portion of fluid from the sealable portion.

7. The microfluidic device as in claim 1, wherein the microfluidic device is a microfluidic cassette.

8. The microfluidic device as in claim 1, wherein the fluidic channel is, at least in part, a microfluidic channel.

9. The microfluidic device as in claim 1, wherein the filter is adapted to retain nucleic acid.

10. The microfluidic device as in claim 9, wherein the filter comprises a solid phase extraction material.

11. The microfluidic device as in claim 1, comprising a seal on the opposing side of the filter to the displacement pump.

12. The microfluidic device as in claim 11 wherein the first volume is greater than 10 μl.

13. The microfluidic device as in claim 11, wherein the seal is a valve that can move between a closed and open position.

14. The microfluidic device as in claim 1, wherein the displacement pump comprises, or is associated with, a pressure actuator for reducing pressure.

15. The microfluidic device as in claim 14, wherein the displacement pump is a deformable bellow.

16. The microfluidic device as in claim 15, wherein the deformable bellow is resiliently biased to expand and/or decompress.

17. The microfluidic device as in claim 5, wherein the displacement pump is a syringe pump.

18. The microfluidic device as in claim 1, wherein the fluidic channel comprises, or is proximate to, a heat source.

19. A method of purifying nucleic acids, the method comprising:

providing the microfluidic device of claim 1;

flowing fluid comprising at least one aqueous PCR inhibitor through the filter;

flowing sample through the filter, such that any nucleic acid potentially present in the sample is bound to or retarded by the filter;

reducing the pressure in the portion of the fluidic channel comprising the filter to substantially simultaneously draw fluid through or over the filter, and to reduce the pressure in said portion of the fluidic channel containing the filter; and flowing elution buffer through the filter to elute any nucleic acid bound to, or associated with, the filter.

20. The method of purifying nucleic acids as in claim 19, further comprising sealing said portion of the fluidic channel comprising the filter, prior to inducing a negative pressure.

21. The method of purifying nucleic acids as in claim 20, further comprising unsealing the sealable portion of the fluidic channel, prior to flowing elution buffer through the filter.

22. The method of purifying nucleic acids as in claim 21, wherein the unsealing the sealable portion occurs by opening a valve that is positioned on the opposing side of the filter than the displacement pump such that air rapidly flows into the unsealed sealable portion, including through the filter, to assist in the removal of any unbound material from said filter.

23. The method of purifying nucleic acids as in claim 19, wherein reducing the pressure in the portion of the fluidic channel comprising the filter results in the pressure in said portion being below atmospheric pressure.

24. The method of purifying nucleic acids as in claim 19, wherein the at least one aqueous PCR inhibitor is ethanol.

25. The method of purifying nucleic acids as in claim 20, wherein the sealing occurs either prior to the step of reducing pressure in the fluidic channel for a period of time to dry the filter or substantially simultaneously with the step of reducing pressure in the fluidic channel for a period of time to dry the filter.

26. The method of purifying nucleic acids as in claim 25, wherein during and/or after the step of reducing pressure in the fluidic channel for a period of time to dry the filter, a temperature of the filter is raised.

* * * * *